United States Patent
Hadeli et al.

(10) Patent No.: US 9,473,384 B2
(45) Date of Patent: Oct. 18, 2016

(54) VALIDATING REACHABILITY OF NODES OF A NETWORK OF AN INDUSTRIAL AUTOMATION AND CONTROL SYSTEM

(71) Applicant: ABB RESEARCH LTD, Zürich (CH)

(72) Inventors: Hadeli Hadeli, Baden (CH); Thanikesavan Sivanthi, Birmenstorf (CH); Otmar Görlitz, Fislisbach (CH); Wolfgang Wimmer, Rietheim (CH)

(73) Assignee: ABB Research Ltd., Zurich (CH)

( * ) Notice: Subject to any disclaimer, the term of this patent is extended or adjusted under 35 U.S.C. 154(b) by 576 days.

(21) Appl. No.: 13/783,897

(22) Filed: Mar. 4, 2013

(65) Prior Publication Data

US 2013/0235764 A1    Sep. 12, 2013

(30) Foreign Application Priority Data

Mar. 7, 2012   (EP) .................................. 12158429

(51) Int. Cl.
*H04L 12/751* (2013.01)
*H04L 12/24* (2006.01)

(52) U.S. Cl.
CPC .......... *H04L 45/02* (2013.01); *H04L 41/0873* (2013.01); *H04L 41/12* (2013.01); *G05B 2219/31362* (2013.01); *Y02P 90/265* (2015.11); *Y04S 40/162* (2013.01); *Y04S 40/164* (2013.01)

(58) Field of Classification Search
CPC ...... Y04S 10/16; Y04S 10/18; Y04S 40/162; H04L 67/12; H04L 67/125; H04L 12/4641; H04L 67/10
See application file for complete search history.

(56) References Cited

U.S. PATENT DOCUMENTS

| | | | |
|---|---|---|---|
| 8,887,266 B2 * | 11/2014 | Liu et al. ........................ | 726/13 |
| 2003/0137532 A1 | 7/2003 | Proulx et al. | |
| 2004/0249916 A1 | 12/2004 | Graves et al. | |
| 2006/0072592 A1 * | 4/2006 | Graves et al. ................ | 370/401 |
| 2006/0174000 A1 * | 8/2006 | Graves ......................... | 709/225 |

FOREIGN PATENT DOCUMENTS

EP    1 326 372 A2    7/2003

OTHER PUBLICATIONS

European Search Report dated Apr. 30, 2012.
(Continued)

*Primary Examiner* — Jung Park
(74) *Attorney, Agent, or Firm* — Taft Stettinius & Hollister LLP

(57) ABSTRACT

A device validates reachability of nodes of a communication network of an industrial automation and control system. The device includes a collector module configured to update a data set including discovered dataflow information by detecting direct neighbor nodes having a physical connection to a selected node, and updating the data set by adding the selected node and those direct neighbor nodes which have configured logical network constraints matching logical network constraints of the selected node. The device includes a repeater module configured to repeat the selecting of a direct neighbor node in the data set and directing the collector module to update the data set using the selected direct neighbor node. The device includes a validation module configured to validate reachability of nodes of the network by comparing the data set with a data set including designed dataflow information which defines reachability requirements for nodes of the communication network.

15 Claims, 8 Drawing Sheets

Legend
C – Collector Module
D – Device
F – Discovered Dataflow Information
N – Control System
O – Consolidator Module
Q – Designed Dataflow Information
R – Repeater Module
S – System Description File
V – Validation Module
Y – Substation Automation and Control System

(56) References Cited

OTHER PUBLICATIONS

Bo Zhang et al., "Reachability Monitoring and verification in enterprise Networks", Aug. 2008, Seattle, Washington, USA, 2 pages.

J.C. Tan et al., "The Importance of IEC 61850 Interoperability Testing", Sep. 2008, Piscataway, New Jersey, USA, 5 pages.

EP 11194437.7, "Validation of a Communication Network of an Industrial Automation and control System", IACS: Industrial Automation and Control System), 24 pages.

* cited by examiner

Legend
1a – Station Computer
2a – Gateway
3a – Event Recorder
4a – Station Bus
1.1a, 1.2a – Process Devices
2.1a, 2.2a – Process Devices
3.1a, 3.2a – Process Devices
4.1a, 4.2a – Process Devices
10a – Intelligent Electronic Device (IED)
20a – IED
30a – IED
40a – IED
11a – Process Bus
21a – Process Bus
31a – Process Bus
41a – Process Bus
100a – Bay Bus
200a – Bay Bus
V2 – Virtual Local Area Network (VLAN)

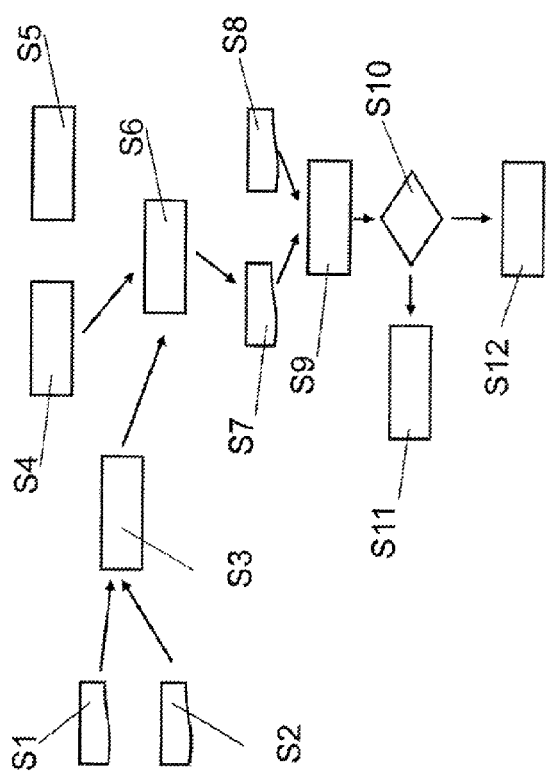

Fig. 8

Legend
S1 – Determine Designed Communication Network Topology
S2 – Determine Commissioned Communication Network Topology
S3 – Generate Comprehensive Communication Network Information
S4 – Perform Physical Reachability Analysis
S5 – Perform Logical Reachability Analysis
S6 – Perform Reachability Analysis
S7 – Generate Communication Network Reachability Analysis Result
S8 – Determine Designed Dataflow
S9 – Compare Reachability Analysis Result to Designed Dataflow
S10 – Determine If Reachability Analysis Result Matches Designed Dataflow
S11 – Decide Reachability Validation Has Failed
S12 – Decide Reachability Validation Is Successful

VALIDATING REACHABILITY OF NODES OF A NETWORK OF AN INDUSTRIAL AUTOMATION AND CONTROL SYSTEM

RELATED APPLICATION

This application claims priority under 35 U.S.C. §119 to European Patent Application No 12158429.6 filed in Europe on Mar. 7, 2012, the entire content of which is hereby incorporated by reference in its entirety.

FIELD

The present disclosure relates to a device and a method for validating the reachability of nodes of a communication network of an industrial automation and control system.

BACKGROUND INFORMATION

Industrial automation and control systems are widely deployed. During an engineering phase, a design of a system is defined, and then the design is deployed during a commissioning phase. In the past, communication between devices or nodes of industrial automation and control systems was based on analog technology and point-to-point connections. Engineers are familiar with the analog technology, both during engineering and commissioning of the industrial automation and control systems, because requirements for such networks are more obvious. However, communication in industrial automation and control systems has become more based on digital communication technologies, such as Ethernet technology, for example. In particular, substation automation systems use Ethernet technology at the station level, at the bay level, as well as at the process level. Ethernet technology not only presents new challenges to the customers, but also to the engineers who design and commission the industrial automation and control system.

In the case of Ethernet technology, communication between devices or nodes of an industrial automation and control system, such as in big industrial systems, often needs to be segregated both physically and logically, wherein techniques such as VLAN (Virtual Local Area Network), multicasting, different conduits (such as firewalls or routers), subnets, etc., for example, are used to provide and guarantee for a proper segmentation, isolation and routing of traffic flow. During an engineering and design phase, as well as during a commissioning phase of a communication network, it is ensured that there is a data path (both physical and logical) between devices or nodes connected to the communication network and which are supposed to communicate with each other. Mistakes during the engineering and design phase as well as mistakes during the commissioning phase, such as wrong network configurations or network installations, may prevent required data paths to function properly, or may make them impossible. The combination of one or more network techniques such as VLAN, multicasting, sub netting, etc. in different sub networks make it difficult to detect, without sending a probe packet, if the required data paths between the devices or nodes connected to the network are working properly.

After receiving an order from a customer, design engineers design a corresponding industrial automation and control system and then generate a system description file. During the design, as well as when commissioning the system, it is necessary to validate the reachability between devices or nodes of the network, given the underlying physical and logical network architecture. In current practice, either reachability validation is manually done to ensure required reachability between devices or nodes of the network, or it is not done at all. In particular, during the engineering and design phase, the engineer has only a model of the network available and does not have the possibility to verify the model in a real deployed network of an industrial automation and control system. However, such reachability validation is important, as at the end of the design phase of the network, a real network is commissioned according to the designed system description file. In case of an error in the design phase, the process has to be reiterated, which is costly and time consuming. Hence, automatic validation of the dataflow during the design phase is important. Moreover, validation of the dataflow is also important during commissioning phase of the network, as well as when a network of an industrial control and automation system is to be expanded or refurbished.

In the context of the present disclosure, the term dataflow implies the flow of data from one device or node of the network of an industrial automation and control system to another device or node of this network. Reachability validation includes the following conditions of a designed or commissioned network: (1) reachability of another node of the network starting from a current node; (2) segregation of another node of the network starting from a current node, that is, the other node is not reachable starting from the current node; (3) in certain cases, a sink node may receive network traffic form different source nodes.

In "Reachability Monitoring and Verification in Enterprise Networks", Zhang et al., SIGCOMM'08, algorithms are presented to monitor and verify all-pairs nodes. For each pair of source and destination zones, the hop-by-hop routing path is calculated. The pairs are sorted in ascent order according to the hop counts. The reachability of all pairs is then calculated according to the sorted order.

SUMMARY

An exemplary embodiment of the present disclosure provides a device for validating reachability of nodes of a communication network of an industrial automation and control system. The exemplary device includes a collector module configured to use a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node. The exemplary device also includes a repeater module configured to repeat the selecting of a direct neighbour node in the data set including discovered dataflow information, and directing the collector module to update the data set including discovered dataflow information using the selected direct neighbour node. In addition, the exemplary device includes a validation module configured to validate reachability of nodes of the network of the industrial automation and control system by comparing the data set including discovered dataflow information with a data set including designed dataflow information which defines reachability requirements for nodes of the communication network of the industrial automation and control system.

An exemplary embodiment of the present disclosure provides a method of validating reachability of nodes of a communication network of an industrial automation and control system. The exemplary method includes using a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node. The exemplary method also includes repeating the selecting of a direct neighbour node in the data set including discovered dataflow information, and updating the data set including discovered dataflow information using the selected direct neighbour node. In addition, the exemplary method includes comparing the data set including discovered dataflow information with a data set including designed dataflow information which defines reachability requirements for nodes of the communication network of the industrial automation and control system.

An exemplary embodiment of the present disclosure provides a non-transitory computer-readable recording medium having a computer program recorded thereon that, when executed, causes one or more processors of a computer processing device to execute operations for validating reachability of nodes of a communication network of an industrial automation and control system. The computer program causes the computer processing device to execute operations including: using a selected node to update a data set including discovered dataflow information by: (i) detecting direct neighbour nodes having a physical connection to the selected node, and (ii) updating the data set including discovered dataflow information by adding the selected node and those direct neighbour nodes which have configured logical network constraints matching logical network constraints of the selected node; repeating the operations of: selecting a direct neighbour node in the data set including discovered dataflow information, and updating the data set including discovered dataflow information using the selected direct neighbour node; and comparing the data set including discovered dataflow information with a data set including designed dataflow information which defines reachability requirements for nodes of the communication network of the industrial automation and control system.

BRIEF DESCRIPTION OF THE DRAWINGS

Additional refinements, advantages and features of the present disclosure are described in more detail below with reference to exemplary embodiments illustrated in the drawings, in which:

FIG. 8 shows an exemplary sequence of steps for validating reachability of nodes of a communication network of an industrial automation and control system.

DETAILED DESCRIPTION

Figure 1:
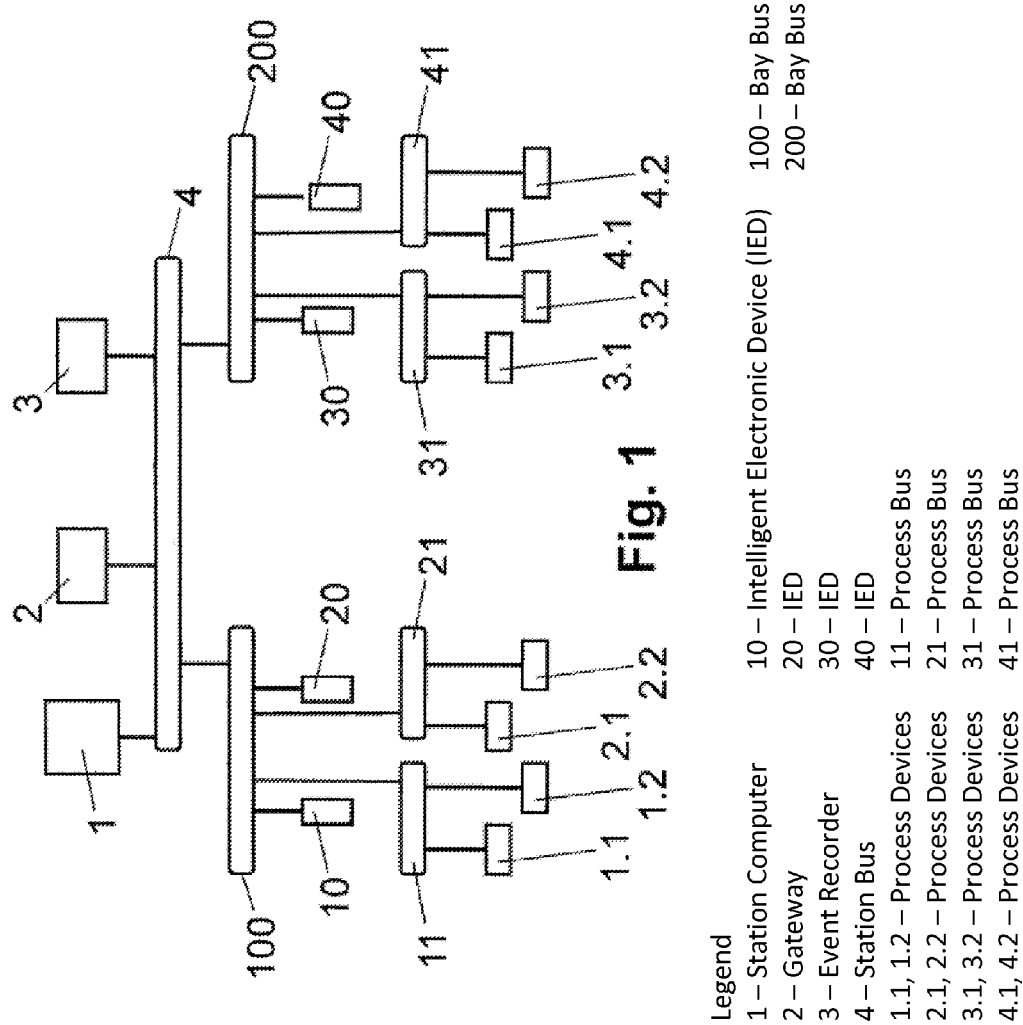
FIG. 1 shows the structure of an industrial automation and control system according to an exemplary embodiment of the present disclosure.

Exemplary embodiments of the present disclosure provide a device and a method for automatically validating reachability of nodes of a communication network of an industrial automation and control system. The device and method of the present alleviate or solve some of the disadvantages associated with known configurations as described above. For instance, exemplary embodiments of the present disclosure provide a device and a method for validating the reachability of nodes of a communication network of an industrial automation and control system, which are applicable to the design of a communication network of an industrial automation and control system as well as to a deployed communication network of an industrial automation and control system.

According to an exemplary embodiment of the present disclosure, a device is provided for validating the reachability of nodes of a communication network of an industrial automation and control system. The exemplary device includes a collector module configured to use a selected node to update a data set including discovered dataflow information by: detecting direct neighbour nodes having a physical connection to the selected node, and updating the data set including discovered dataflow information by adding the selected node and those direct neighbour nodes which have configured logical network constraints matching logical network constraints of the selected node. The exemplary device also includes a repeater module configured to repeat the operations of: selecting a direct neighbour node in the data set including discovered dataflow information and directing the collector module to update the data set including discovered dataflow information using the selected direct neighbour node. In addition, the exemplary device includes a validation module configured to validate the reachability of nodes of the network of the industrial automation and control system by comparing the data set including discovered dataflow information with a data set including designed dataflow information which defines reachability requirements for nodes of the communication network of the industrial automation and control system. The collector module is configured so that any selected node is used to update the set of discovered data flow, such as a selected node determined by an operator or determined in any other way. The direct neighbours are then collected and it is also determined if connectivity is provided logically, for example, by determining if the nodes have the same logical constraints. The neighbour nodes which have been found are then used to determine further neighbour nodes, until the dataflow of the network is fully determined or until a loop is detected.

In accordance with an exemplary embodiment, the collector module is further configured to define a set of source nodes of the communication network of the industrial automation and control system, and to update the data set including discovered dataflow information using one or more nodes of the set of source nodes. Hence, all nodes which are reachable from the set of source nodes are determined, such that reachability validation for the set of source nodes can be fully determined.

In accordance with an exemplary embodiment, the collector module is configured to collect direct neighbour nodes having one or more of the following connections: cable wire connection, radio signal connection, optical wire connection, and even light-based communication. Hence, widely used connection types for establishing physical connections between nodes of the network can be taken into account.

In accordance with an exemplary embodiment, the collector module is configured to collect direct neighbour nodes having a physical connection driven by one or more of the following networking standards: Ethernet and Internet Protocol. Accordingly, widely used network standards can be taken into account to establish physical connections.

In accordance with an exemplary embodiment, the collector module is configured to add direct neighbour nodes having a logical connection defined by one or more of the following networking techniques: virtual local network settings, subnet settings, and multicast settings. Hence, widely used techniques for logically segregating networks can be taken into account for the validation of the reachability of nodes.

In accordance with an exemplary embodiment, the collector module is configured to use a system description file of an engineered industrial automation and control system for detecting direct neighbour nodes of the selected node and for determining the direct neighbour nodes which have configured the same logical network constraints as the selected node. The system description file may conform to an industry standard such as, for example, a IEC61850 standard. Validation does not require a deployed network, but may already take place during a design phase.

In accordance with an exemplary embodiment, the device also includes a consolidator module configured to consolidate physical and logical information of a deployed substation automation and control system into consolidated system data, wherein the collector module is configured to use the consolidated system data for detecting direct neighbour nodes of the selected node and for determining the direct neighbour nodes which have configured the same logical network constraints as the selected node. The consolidation may include the operation of requesting devices of a deployed network to transmit connections to direct neighbours, together with logical constraints. Accordingly, deployed networks may be validated. Moreover, expansion or refurbishing of deployed networks may be validated as well.

In addition to a device for validating reachability of nodes of a communication network of an industrial automation and control system, an exemplary embodiment of the present disclosure also provides a method of validating the reachability of nodes of a communication network of an industrial automation and control system. The exemplary method includes using a selected node to update a data set including discovered dataflow information by performing the steps of: detecting direct neighbour nodes having a physical connection to the selected node, and updating the data set including discovered dataflow information by adding the selected node and those direct neighbour nodes which have configured logical network constraints matching logical network constraints of the selected node; repeating the steps of: selecting a direct neighbour node in the data set including discovered dataflow information and updating the data set including discovered dataflow information using the selected direct neighbour node, and comparing the data set including discovered dataflow information with a data set including designed dataflow information which defines reachability requirements for nodes of the communication network of the industrial automation and control system. In an exemplary embodiment, the method also includes defining a set of source nodes of the communication network of the industrial automation and control system and using one or more nodes of the set of source nodes to update the data set including discovered dataflow information. In accordance with an exemplary embodiment, the method can also include using a system description file of an engineered industrial automation and control system for detecting direct neighbours of the selected node and for determining the direct neighbour nodes which have configured the same logical network constraints as the selected node. In accordance with an exemplary embodiment, the method can also include consolidating physical and logical information of a deployed substation automation and control system into consolidated system data, and using the consolidated system data for detecting direct neighbour nodes of the selected node and for determining the direct neighbour nodes which have configured the same logical network constraints as the selected node.

In addition to a device and a method for validating reachability of nodes of a communication network of an industrial automation and control system, an exemplary embodiment of the present disclosure also provides a non-transitory computer-readable recording medium (e.g., a non-volatile memory) having tangibly recorded thereon a computer program that causes one or more processors of a device (e.g., a computer processing device) to carry out operations for validating the reachability of nodes of a communication network of an industrial automation and control system. The computer program, when executed, causes the device to: use a selected node to update a data set including discovered dataflow information by performing the steps of: detecting direct neighbour nodes having a physical connection to the selected node, and updating the data set including discovered dataflow information by adding the selected node and those direct neighbour nodes which have configured logical network constraints matching logical network constraints of the selected node; and repeat the steps of: selecting a direct neighbour node in the data set including discovered dataflow information and updating the data set including discovered dataflow information using the selected direct neighbour node, and comparing the data set including discovered dataflow information with a data set including designed dataflow information which defines reachability requirements for nodes of the communication network of the industrial automation and control system. In accordance with an exemplary embodiment, the computer program, when executed, also causes the device to: define a set of source nodes of the communication network of the industrial automation and control system and use one or more nodes of the set of source nodes to update the data set including discovered dataflow information. In accordance with an exemplary embodiment, the computer program, when executed, also causes the device to: use a system description file of an engineered industrial automation and control system for detecting direct neighbours of the selected node and for determining the direct neighbour nodes which have configured the same logical network constraints as the selected node. In accordance with an exemplary embodiment, the computer program, when executed, also causes the device to: consolidate physical and logical information of a deployed substation automation and control system into consolidated system data, and use the consolidated system data for detecting direct neighbour nodes of the selected node and for determining the direct neighbour nodes which have configured the same logical network constraints as the selected node.

FIG. 1 shows a block diagram illustrating schematically an exemplary substation automation system as requested by a customer, wherein nodes are connected through a communication network according to customer requirements. The connections between the nodes of the substation automation system are established using any physical connection, such as, for example, cable wires for transmitting electrical signals, optical wires for transmitting optical signals such as visible light signals, or any other physical connection technology configured to transmit and receive a communication signal from one node to another node. In an exemplary embodiment, the physical connections are established using an Ethernet technology.

The nodes of the substation automation system according to FIG. 1 include, for example, a station computer 1, a gateway 2, and an event recorder 3, which are all connected to a station bus 4. The station bus 4 is connected to a first bay bus 100 and to a second bay bus 200. The first bay bus 100 is connected to a first intelligent electronic device 10 and to a second electronic device 20. The second bay 200 bus is connected to a third intelligent electronic device 30 and to a fourth intelligent electronic device 40. A first process bus 11 and a second process bus 21 are connected to the first bay bus 100. A third process bus 31 and a fourth process bus 41 are connected to the second bay bus 200. A first set of process devices 1.1, 1.2, a second set of process devices 2.1, 2.2, a third set of process devices 3.1, 3.2, and a fourth set of process devices 4.1, 4.2 are connected to the first process bus 11, to the second process bus 21, to the third process bus 31, and to the fourth process bus 41, respectively.

In the present disclosure, the abbreviation IED is also used for the term "intelligent electronic device".

Figure 2:
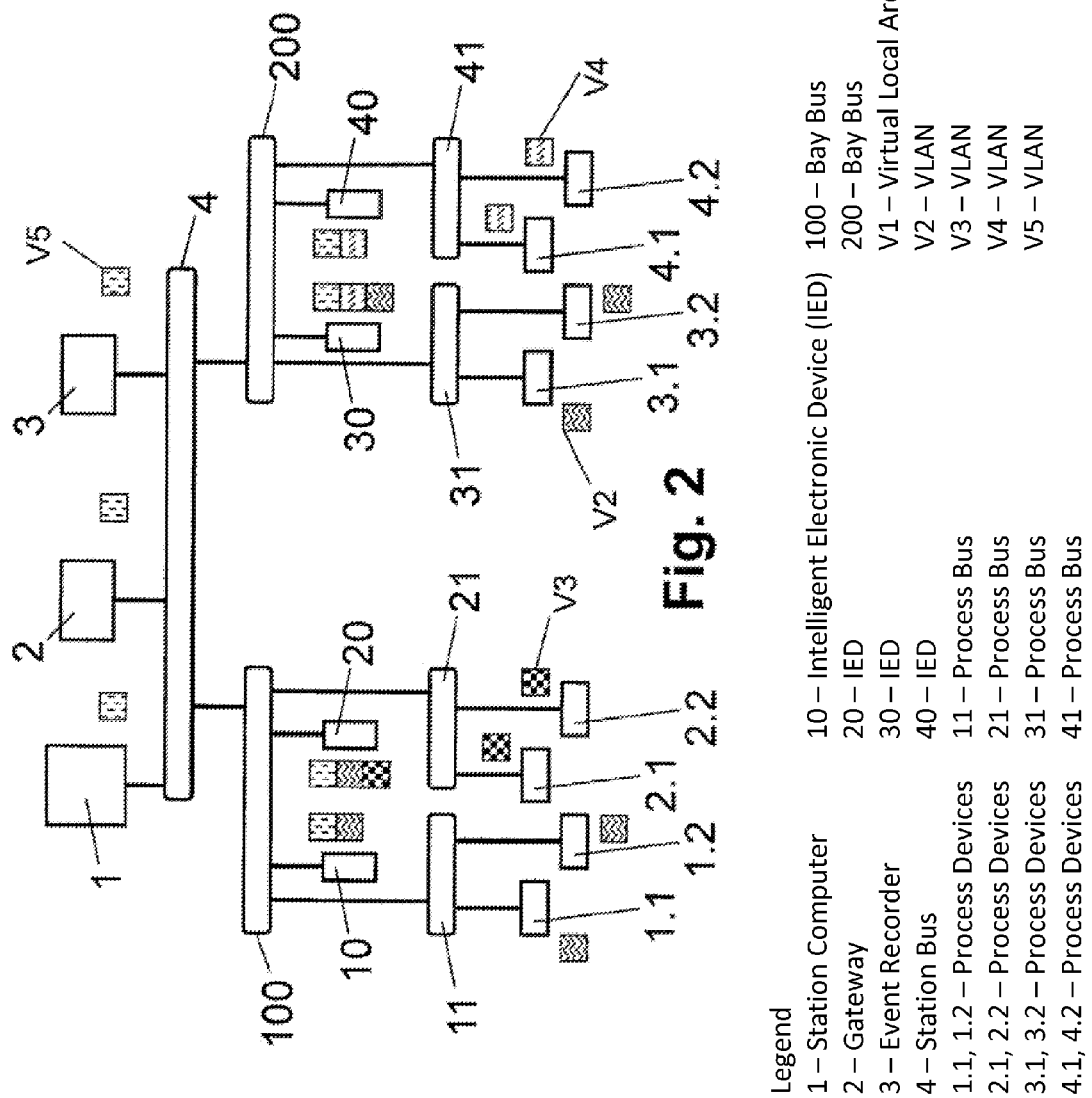
FIG. 2 shows an exemplary embodiment of an industrial automation and control system having several network nodes with different virtual local area network settings.

After receiving the specification of a substation automation system as requested by a customer, design engineers generate a design of the substation automation system, which includes a design document comprising dataflow information. FIG. 2 shows a block diagram illustrating schematically data flow information of a substation automation system, wherein it is reflected which groups of nodes are designed to communicate together. In FIG. 2, the nodes designed to communicate with each other are marked with a pattern.

After designing the dataflow, the design engineers next design the network segmentation, for example. In an exemplary embodiment, each group of nodes designed to communicate with each other represents a VLAN (Virtual Local Area Network).

As indicated in FIG. 2, for example, station computer 1, gateway 2, event recorder 3, first intelligent electronic device 10, second intelligent electronic device 20, third intelligent electronic device 30, and fourth intelligent electronic device 40 are designed to communicate with each other and are assigned, for example, to a fifth VLAN V5.

As further indicated in FIG. 2, for example, first intelligent electronic device 10, second intelligent electronic device 20, third intelligent electronic device 30, first set of process devices 1.1, 1.2, and third set of electronic devices 3.1, 3.2 are designed to communicate with each other and are assigned, for example, to a second VLAN V2.

As indicated in FIG. 2, for example, second intelligent electronic device 20 and second set of electronic devices 2.1, 2.2 are designed to communicate with each other and are assigned, for example, to a third VLAN V3.

As further indicated in FIG. 2, for example, third intelligent electronic device 30, fourth intelligent electronic device 40, and fourth set of process devices 4.1, 4.2 are designed to communicate with each other and are assigned, for example, to a fourth VLAN V4.

In FIG. 2, the nodes are marked with a pattern to show their accommodations to the respective VLAN. However, for clarity reasons, in FIG. 2 only one of these patterns is marked with the corresponding reference sign.

The following table shows the designed logical information regarding network and communication in this exemplary substation automation system.

| No. | Node name | IP address | VLAN |
|-----|-----------|------------|------|
| 1 | station computer 1 | 192.168.10.11 | V5 |
| 2 | gateway 2 | 192.168.10.12 | V5 |
| 3 | event recorder 3 | 192.168.10.13 | V5 |
| 4 | switch for station bus 4 | 192.168.10.14 | all |
| 5 | switch for first bay bus 100 | 192.168.10.15 | all |
| 6 | switch for second bay bus 200 | 192.168.10.16 | all |
| 7 | IED 10 | 192.168.10.17 | V2, V5 |
| 8 | IED 20 | 192.168.10.18 | V2, V3, V5 |
| 9 | IED 30 | 192.168.10.19 | V2, V4, V5 |
| 10 | IED 40 | 192.168.10.20 | V4, V5 |
| 11 | switch for first process bus 11 | 192.168.10.100 | all |
| 12 | switch for second process bus 21 | 192.168.10.200 | all |
| 13 | switch for third process bus 31 | 192.168.10.300 | all |
| 14 | switch for fourth process bus 41 | 192.168.10.400 | all |
| 15 | process device 1.1 | 192.168.10.101 | V2 |
| 16 | process device 1.2 | 192.168.10.102 | V2 |
| 17 | process device 2.1 | 192.168.10.201 | V3 |
| 18 | process device 2.2 | 192.168.10.202 | V3 |
| 19 | process device 3.1 | 192.168.10.301 | V2 |
| 20 | process device 3.2 | 192.168.10.302 | V2 |
| 21 | process device 4.1 | 192.168.10.401 | V4 |
| 22 | process device 4.2 | 192.168.10.402 | V4 |

Based on the information contained in above table, commissioning engineers deploy the substation automation system network accordingly.

Figure 3:
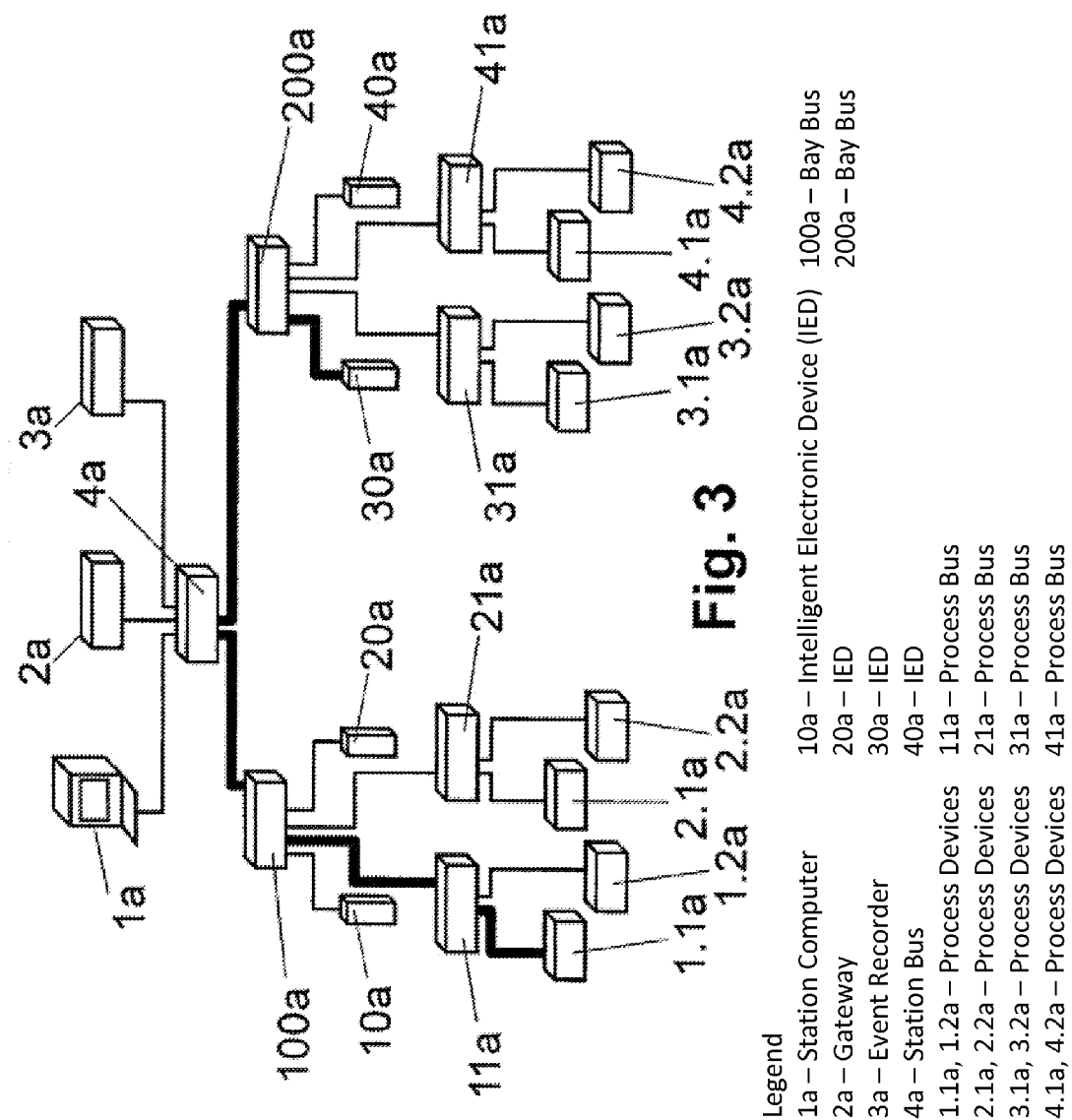
FIG. 3 shows an exemplary embodiment of an industrial automation and control system having network devices connected to each other, wherein reachability of a particular nodes is to be validated.

FIG. 3 shows schematically the deployed network of the substation automation system. The station computer 1a, the gateway 2a and the event recorder 3a are connected to the switch for station bus 4a. The switch for station bus 4a is connected to a switch for the first bay bus 100a and a switch for the second bay bus 200a. The switch for the first bay bus 100a is connected to a first IED 10a and to a second IED 20a, as well as to a switch for a first process bus 11a and a switch for a second process bus 21a. The switch for the second bay bus 200a is connected to a third IED 30a and a fourth IED 40a, as well as to a switch for a third process bus 31a and a fourth process bus 41a. The switch for the first process bus 11a is connected to a first set of process devices 1.1a, 1.2a, the switch of the second process bus 21a is connected to a second set of process devices 2.1a, 2.2a, the switch of the third process bus 31a is connected to a third set of process devices 3.1a, 3.2a, and the switch of the fourth process bus 41a is connected to a fourth set of process devices 4.1a, 4.2a.

The reachability is to be analyzed for the designed network and for the deployed network. For the purpose of explanation, it is assumed that the third IED 30a shall get an input from a first process device 1.1a, which is one of the members of the first set of process devices 1.1a, 1.2a. In FIG. 3, the reachability corresponding to the example is marked with thick lines.

In a first step, it is analyzed if a physical connectivity exists between the third IED 30*a* and the first process device 1.1*a*, which is shown in FIG. 3.

In a second step, the logical connectivity of the designed network (cf. table shown above) is also checked on the basis of the same nodes, namely the communication between the third IED 30*a* and the first process device 1.1*a*, both members of VLAN V2. The network with VLAN information is shown in FIG. 4.

Figure 4:
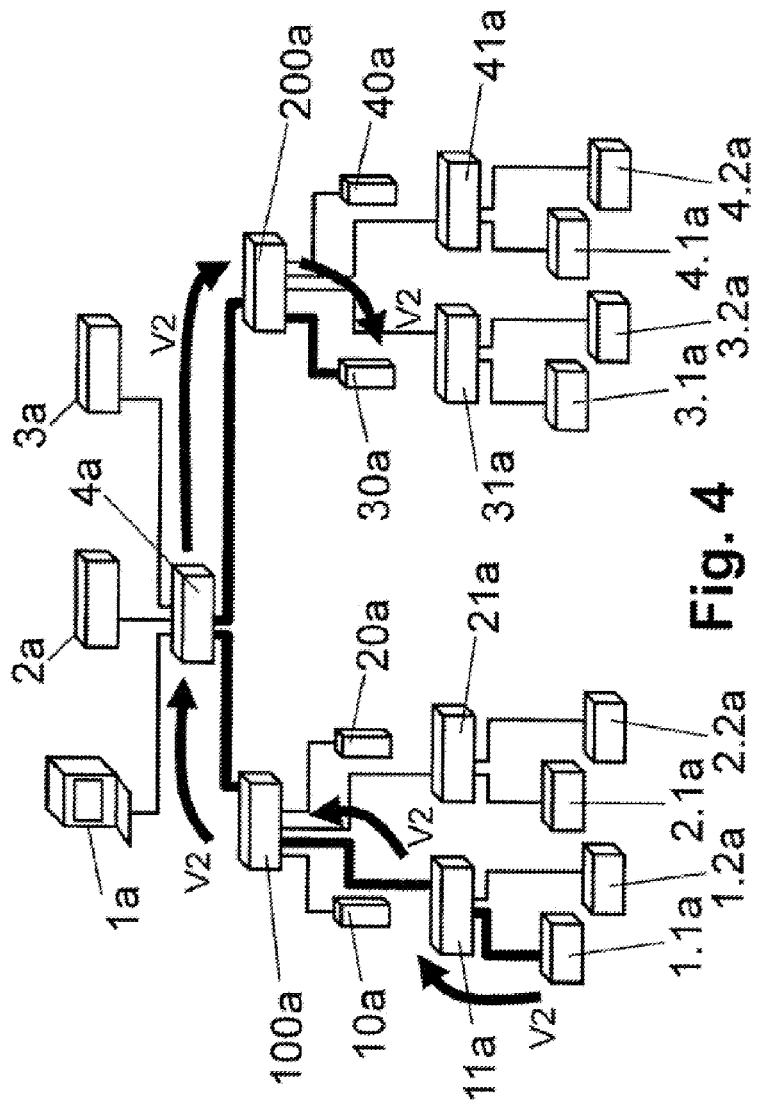
FIG. 4 shows an exemplary embodiment of an industrial automation and control system having network devices connected to each other and having particular logical constraints, wherein reachability of a particular nodes is to be validated.

The graph shown in FIG. 4 can be represented by the following table, wherein the communication path between the first process device 1.1*a* and the third IED 30*a* is indicated by the underlined entries, and wherein for each entry the logical assignment with respect to the VLANs is indicated.

| Device | Next direct reachable neighbor |
| --- | --- |
| first process device $1.1a^{V2}$ | switch for first process bus $11a^{all}$ |
| switch for first process bus $11a^{all}$ | first process device $1.1a^{V2}$, second process device $1.2a^{V2}$, switch for first bay bus $100a^{all}$ |
| switch for first bay bus $100a^{all}$ | first IED $10a^{V2}$, first IED $10a^{V5}$, second IED $20a^{V2}$, second IED $20a^{V3}$, second IED $20a^{V5}$, switch for first process bus $11a^{all}$, switch for second process bus $21a^{all}$, switch for station bus $4a^{all}$ |
| switch for station bus $4a^{all}$ | station computer $1a^{V5}$, gateway $2a^{V5}$, event recorder $3a^{V5}$, switch for first bay bus $100a^{all}$, switch for second bay bus $200a^{all}$ |
| switch for second bay bus $200a^{all}$ | third IED $30a^{V2}$, third IED $30a^{V4}$, third IED $30a^{V5}$, fourth IED $40a^{V4}$, fourth IED $40a^{V5}$, switch for third process bus $31a^{all}$, switch for fourth process bus $41a^{all}$ |
| third IED $30a^{V2}$ | — |

When both the physical and the logical test pass, it can be concluded that it is possible for the third IED 30*a* to receive an input from the first process device 1.1*a*, for example, a sample value captured by the first process device 1.1*a* and needed by the third IED 30*a* as an input to perform certain functions.

Figure 5:
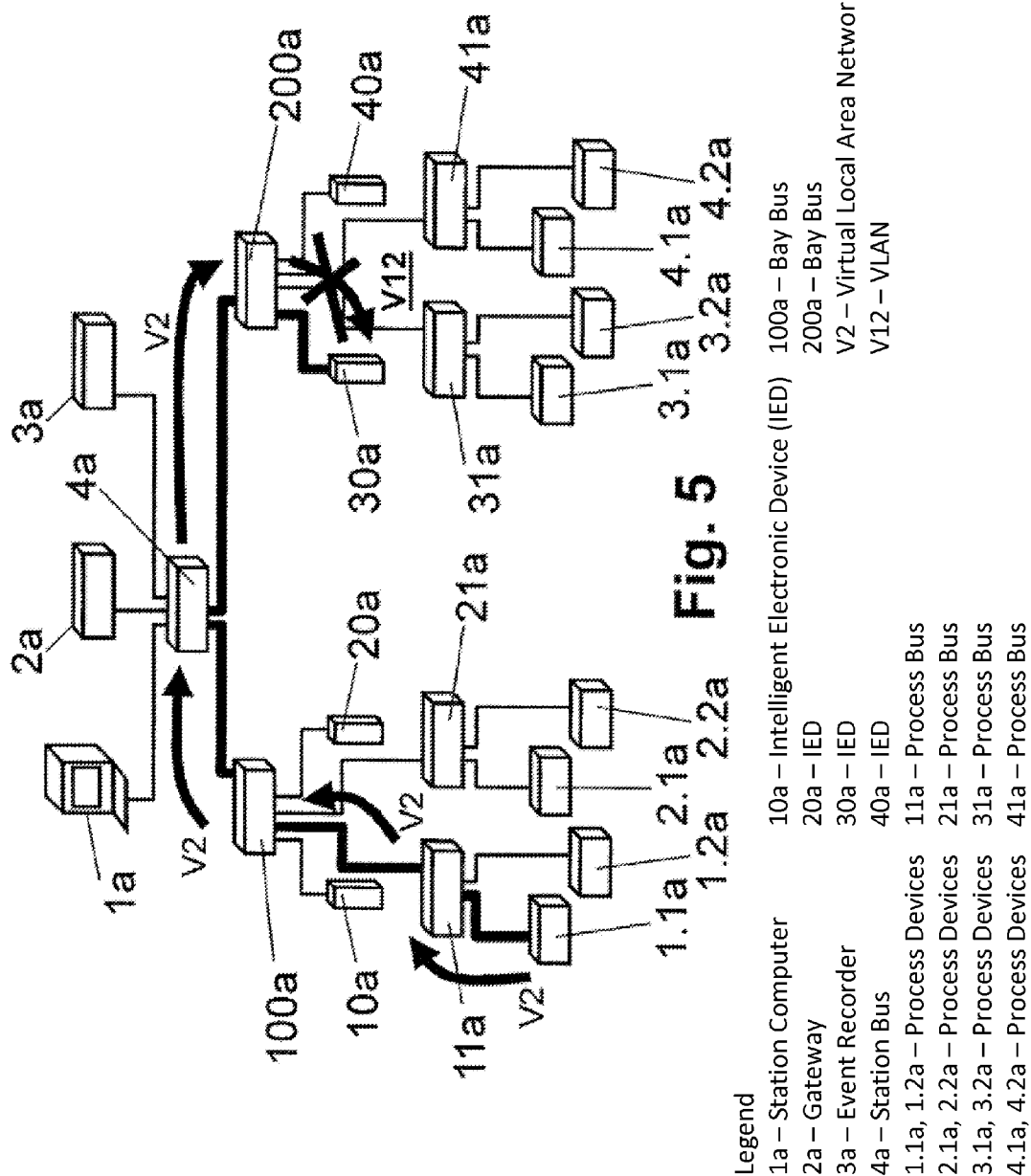
FIG. 5 shows an exemplary embodiment of an industrial automation and control system having network devices connected to each other and having particular logical constraints, wherein the system includes a configuration error preventing reachability of nodes.

After commissioning the network, it is important to again check the reachability of the network nodes. In an example, which is shown in FIG. 5, during commissioning of the network, the VLAN configuration for third IED 30*a* has been wrongly set to VLAN V12 instead of VLAN V2. This can be represented by the following table.

| Device | Next direct reachable neighbour |
| --- | --- |
| first process device $1.1a^{V2}$ | switch for first process bus $11a^{all}$ |
| switch for first process bus $11a^{all}$ | first process device $1.1a^{V2}$, second process device $1.2a^{V2}$, switch for first bay bus $100a^{all}$ |
| switch for first bay bus $100a^{all}$ | first IED $10a^{V2}$, first IED $10a^{V5}$, second IED $20a^{V2}$,, second IED $20a^{V3}$, second IED $20a^{V5}$, switch for first process bus $11a^{all}$, switch for second process bus 21a, switch for station bus $4a^{all}$ |
| switch for station bus $4a^{all}$ | station computer $1a^{V5}$, gateway $2a^{V5}$, event recorder $3a^{V5}$, switch for first bay $100a^{all}$, switch for second bay bus $200a^{all}$ |
| switch for second bay bus $200a^{all}$ | third IED $30a^{V12}$, third IED $30a^{V4}$, third IED $30a^{V5}$, fourth IED $40a^{V4}$ fourth IED $40a^{V5}$, switch for third process bus $31a^{all}$, switch for fourth process bus $41a^{all}$ |
| third IED $30a^{V12}$ | — |

Hence, reachability between the third IED 30*a* and the first process device 1.1*a* is broken due to a misconfiguration of the VLAN settings. In particular, no logical connection exists between the switch for the second bay 200*a* and the third IED 30*a*.

Figure 6:
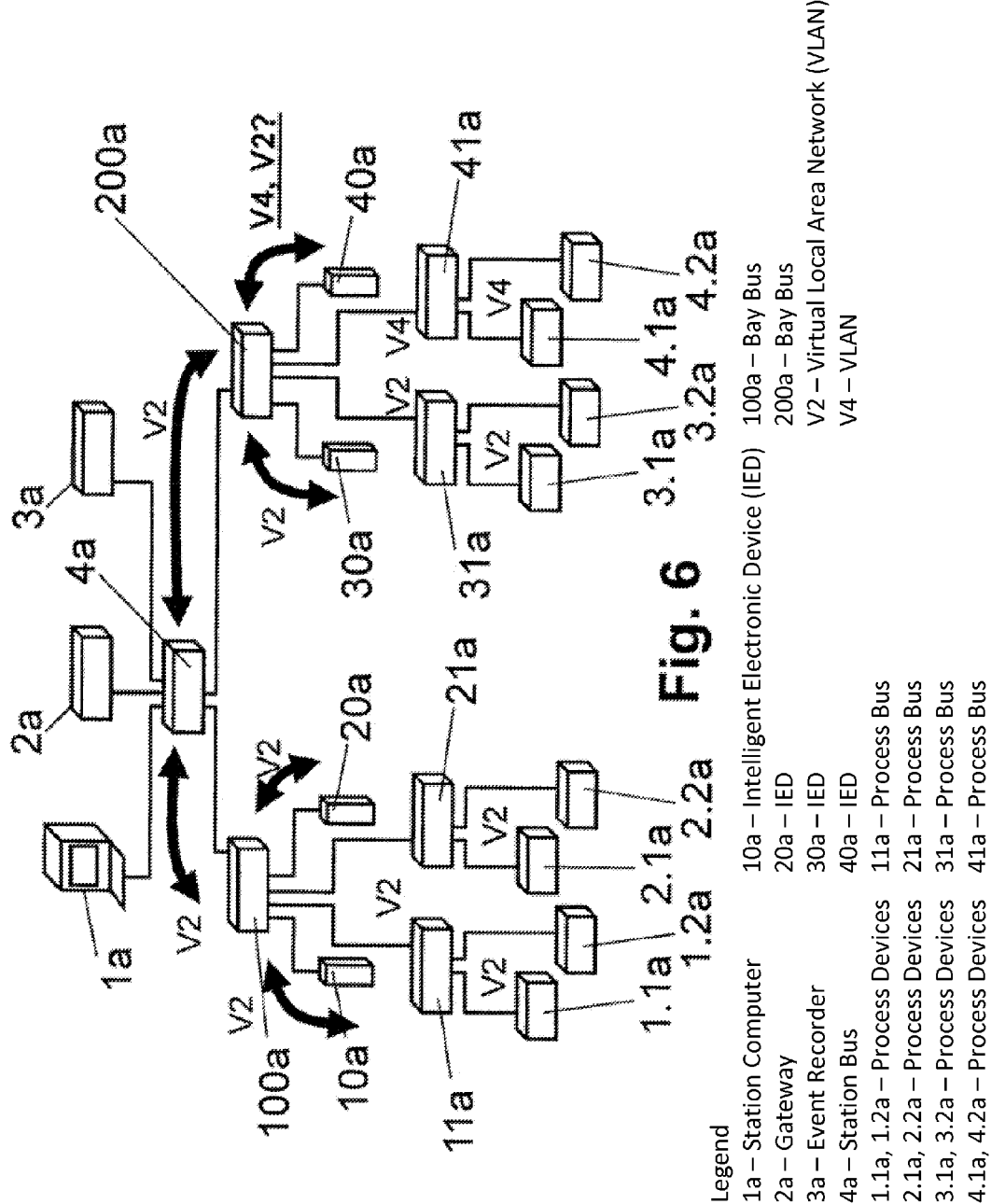
FIG. 6 shows an exemplary embodiment of an industrial automation and control system having network devices connected to each other and having particular logical constraints, wherein the system includes a configuration error wrongly enabling reachability of nodes.

Reachability does not only concern nodes which must be able to communicate with each other, but also concerns the situation where certain nodes must not be able to communicate with each other. This concept is explained together with an example illustrated in FIG. 6. According to design considerations, no traffic from the first IED 10*a* shall reach the fourth IED 40*a*. In the reachability analysis, this should also be detected, wherein a network not fulfilling the segregation of fourth IED 40*a* from first IED 10*a* is to be considered as failed. As indicated in FIG. 6, a misconfiguration at the switch for the second bay 200*a* may lead to such failure, when instead of only configuring VLAN V4, also VLAN V2 is configured as well.

After completing the reachability analysis, the next step is to validate whether the determined dataflow complies with the dataflow of the designed/engineered network.

Figure 7:
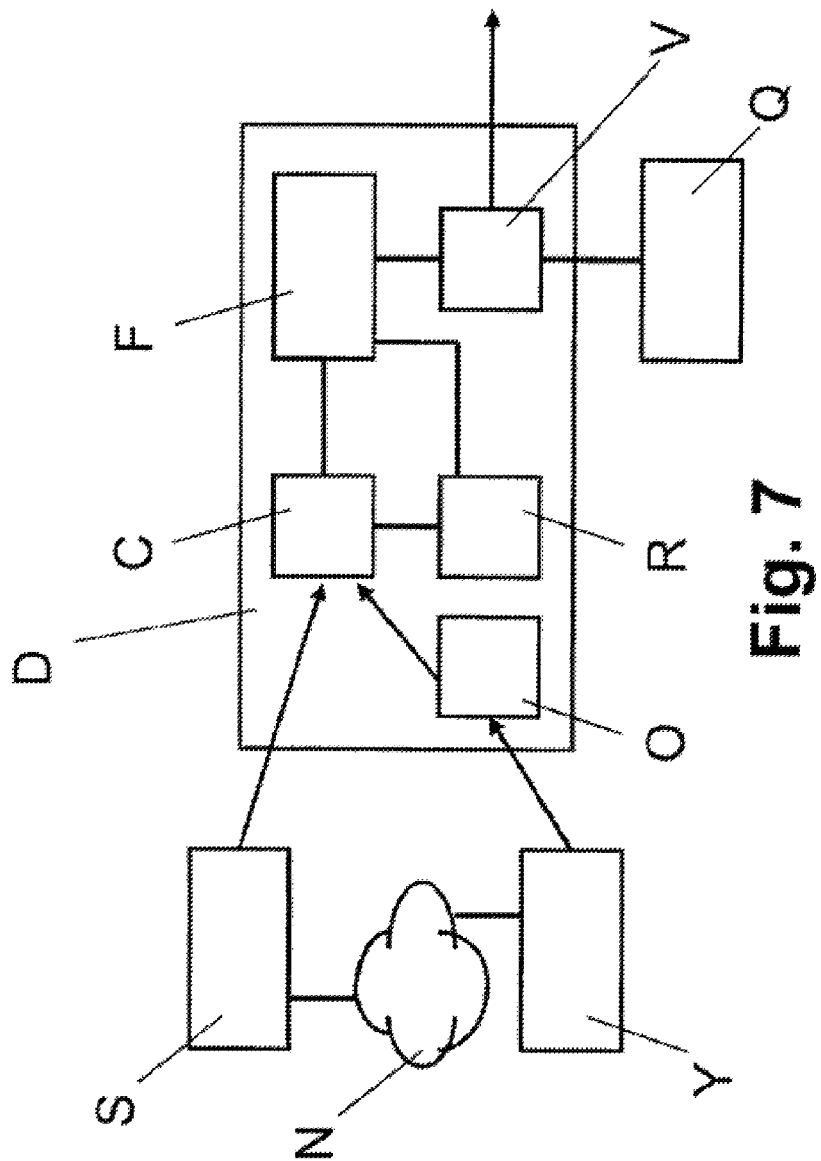
FIG. 7 shows an exemplary embodiment of a device for validating reachability of nodes of a communication network of an industrial automation and control system.

FIG. 7 shows schematically a device D for validating reachability of nodes of a communication network of an industrial automation and control system N. The device D includes a collector module C, a repeater module R and a validation module V.

The collector module C is configured to use a selected node of the communication network of an industrial automation and control system, and to update a data set including discovered dataflow information F. As described above, the direct neighbour nodes having a physical connection to the selected node are determined and the data set including discovered dataflow information F by adding the selected node and those direct neighbour nodes which have the same logical constraints as the selected node, for example the same VLAN settings, the same subnet mask, the same multicast address, etc.

The repeater module R is configured to select a direct neighbour node in the data set including discovered dataflow information F and to direct the collector module C to update the data set including discovered dataflow information F using the selected direct neighbour node. For example, the repeater module R updates the discovered dataflow F until all possible nodes are added to the discovered dataflow F. In an exemplary embodiment, the repeater module stops selecting a direct neighbour node in the data set including discovered dataflow information F in case a loop is detected.

The validation module V is configured to validate the reachability of nodes of the network of the industrial automation and control system N by comparing the data set including discovered dataflow information F with a data set including designed dataflow information Q which defines reachability requirements for nodes of the communication network of the industrial automation and control system N. Rechability is validated both in the positive and the negative sense, namely in the sense that required communication between nodes is validated and communication between nodes that may not take place is validated as well.

As indicated schematically in FIG. 7, the collector module C is configured to use a system description file S of an engineered industrial automation and control system for detecting direct neighbour nodes of the selected node and for determining the direct neighbour nodes which have configured the same logical network constraints as the selected node. Nodes which have configured the same logical network constraints as each other have, for example, the same logical constraints. Hence, already in the design phase, the reachability of nodes can be validated. In an exemplary embodiment, the system description file S conforms to the IEC61850 standard.

As also indicated in FIG. 7, data of a deployed substation automation and control system Y is consolidated by a consolidator module O into consolidated system data, which is used by the collector module C for detecting direct neighbour nodes and for determining the direct neighbour nodes which have configured the same logical network constraints as the selected nodes. In an exemplary embodiment, consolidation includes the step of building a network interconnectivity model, for example, obtained as described in EP 11194437.7 with the title "Validation of deployed IACS network against engineered IACS network" (IACS: Industrial Automation and Control System), the entire disclosure of which is incorporated herein by reference. Hence, during or after commissioning of a network, reachability of nodes can be validated. In particular, in case a network has to be expanded or refurbished, reachability of nodes can be validated on a regular basis or when desired.

Specifically, the network communication model may be stored in a machine readable format as effective data, wherein all the physical connectivity, as well as logical connectivity and all relevant network related configuration information is included. The logical connectivity may include VLAN filters, multicasting filters, etc. In order to obtain VLAN settings and multicast filters, each network component, for example, each network switch or control, may be contacted, for example, using a Q-BRIDGE-MIB (MIB: Management Information Base).

In general, when retrieving information form designed/engineered data, the dataflow information holds information such as: source points, sink points, multicast address (e.g. GOOSE, see below), etc. Each point may have different properties based on the network context for which it is designed, for example, the address type of a source point may be a MAC address, an IPv4 address, an IPv6 address, etc. A sample intelligent electronic device (IED) description (SCD excerpt) for a GOOSE message with the destinations AA1D1Q10A2 and AA1D1Q10A3 is as follows:

```
<IED name="AA1D1Q10A1">
<AccessPoint name="S1"><Server><Authentication/>
<LDevice inst="LD0">
<LN0 InType="myLLN0" inst="" InClass="LLN0">
<DataSet name="SyckResult">
<FCDA IdInst="LD0" prefix="" InClass="RSYN" InInst="1"
doName="Rel" fc="ST"/>
</DataSet>
<GSEControl name="SyckResult" datSet="SyckResult" confRev="1"
appID="SynChk">
<IEDName>AA1D1Q10A2</IEDName>
<IEDName>AA1D1Q10A3</IEDName>
</GSEControl></LN0></LDevice></Server></AccessPoint>
</IED>
```

FIG. 8 shows schematically exemplary steps for validating the reachability of nodes of a communication network of an industrial automation and control system. In step S1, the designed communication network topology is determined. In step S2, the commissioned communication network topology is determined. Step S1 and step S2 may be performed alternatively, depending on if reachability of nodes of a designed or a commissioned network are to be validated. In step S3, comprehensive communication network information is generated. In step S4, a physical reachability analysis is performed. In step S5, a logical reachability analysis is performed. In an exemplary embodiment, step S4 and step S5 can be performed in one single step. In step S6, reachability analysis is performed, and in step S7 a communication network reachability analysis result is generated. In step S8, a designed dataflow is determined. In step S9, the reachability analysis result is compared to the designed dataflow. In step S10, it is determined, if the reachability analysis result matches the designed dataflow. In step S11, it is decided that the reachability validation has failed. In step S12, it is decided that the reachability validation is successful.

It will be appreciated by those skilled in the art that the present invention can be embodied in other specific forms without departing from the spirit or essential characteristics thereof. The presently disclosed exemplary embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A device for validating reachability of nodes of a communication network of an industrial automation and control system, the device comprising:
   a collector module configured to use a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node;
   a repeater module configured to repeat the selecting of a direct neighbour node in the data set including discovered dataflow information, and directing the collector module to update the data set including discovered dataflow information using the selected direct neighbour node; and
   a validation module configured to validate reachability of nodes of the network of the industrial automation and control system by comparing the data set including discovered dataflow information with a data set including designed dataflow information which defines reachability requirements for nodes of the communication network of the industrial automation and control system.

2. The device according to claim 1, wherein the collector module is configured to define a set of source nodes of the communication network of the industrial automation and control system, and to update the data set including discovered dataflow information using one or more nodes of the set of source nodes.

3. The device according to claim 1, wherein the collector module is configured to collect direct neighbour nodes having at least one of a cable wire connection, a radio signal connection, and an optical wire connection.

4. The device according to claim 1, wherein the collector module is configured to collect direct neighbour nodes having a physical connection driven by at least one of the Ethernet standard, and the Internet Protocol standard.

5. The device according to claim 1, wherein logical network constraints are defined by at least one of virtual local network settings, subnet settings, and multicast settings.

6. The device according to claim 1, wherein the collector module is configured to use a system description file of an engineered industrial automation and control system for detecting direct neighbour nodes of the selected node and for determining the direct neighbour nodes which have configured the same logical network constraints as the selected node.

7. A device for validating reachability of nodes of a communication network of an industrial automation and control system, the device comprising:
- a collector module configured to use a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node;
- a repeater module configured to repeat the selecting of a direct neighbour node in the data set including discovered dataflow information, and directing the collector module to update the data set including discovered dataflow information using the selected direct neighbour node;
- a validation module configured to validate reachability of nodes of the network of the industrial automation and control system by comparing the data set including discovered dataflow information with a data set including designed dataflow information which defines reachability requirements for nodes of the communication network of the industrial automation and control system; and
- a consolidator module configured to consolidate physical and logical information of a deployed substation automation and control system into consolidated system data,
- wherein the collector module is configured to use the consolidated system data for detecting direct neighbour nodes of the selected node and for determining the direct neighbour nodes which have configured the same logical network constraints as the selected node.

8. A method of validating reachability of nodes of a communication network of an industrial automation and control system, the method comprising:
- using a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node;
- repeating the selecting of a direct neighbour node in the data set including discovered dataflow information, and updating the data set including discovered dataflow information using the selected direct neighbour node; and
- comparing the data set including discovered dataflow information with a data set including designed dataflow information which defines reachability requirements for nodes of the communication network of the industrial automation and control system.

9. The method according to claim 8, comprising:
- defining a set of source nodes of the communication network of the industrial automation and control system and using one or more nodes of the set of source nodes to update the data set including discovered dataflow information.

10. The method according to claim 8, comprising:
- using a system description file of an engineered industrial automation and control system for detecting direct neighbours of the selected node and for determining the direct neighbour nodes which have configured the same logical network constraints as the selected node.

11. A method of validating reachability of nodes of a communication network of an industrial automation and control system, the method comprising:
- using a selected node to update a data set including discovered dataflow information by (i) detecting direct neighbour nodes having a physical connection to the selected node, and (ii) updating the data set including discovered dataflow information by adding the selected node and those direct neighbour nodes which have configured logical network constraints matching logical network constraints of the selected node;
- repeating the selecting of a direct neighbour node in the data set including discovered dataflow information, and updating the data set including discovered dataflow information using the selected direct neighbour node;
- comparing the data set including discovered dataflow information with a data set including designed dataflow information which defines reachability requirements for nodes of the communication network of the industrial automation and control system;
- consolidating physical and logical information of a deployed substation automation and control system into consolidated system data; and
- using the consolidated system data for detecting direct neighbour nodes of the selected node and for determining the direct neighbour nodes which have configured the same logical network constraints as the selected node.

12. A non-transitory computer-readable recording medium having a computer program recorded thereon that, when executed, causes one or more processors of a computer processing device to execute operations for validating reachability of nodes of a communication network of an industrial automation and control system, the computer program causing the computer processing device to execute operations comprising:
- using a selected node to update a data set including discovered dataflow information by: (i) detecting direct neighbour nodes having a physical connection to the selected node, and (ii) updating the data set including discovered dataflow information by adding the selected node and those direct neighbour nodes which have configured logical network constraints matching logical network constraints of the selected node;
- repeating the operations of: selecting a direct neighbour node in the data set including discovered dataflow information, and updating the data set including discovered dataflow information using the selected direct neighbour node; and
- comparing the data set including discovered dataflow information with a data set including designed dataflow information which defines reachability requirements for nodes of the communication network of the industrial automation and control system.

13. The non-transitory computer-readable recording medium according to claim 12, wherein the computer program causes the computer processing device to execute operations comprising:

defining a set of source nodes of the communication network of the industrial automation and control system and use one or more nodes of the set of source nodes to update the data set including discovered dataflow information.

14. The non-transitory computer-readable recording medium according to claim 12, wherein the computer program causes the computer processing device to execute operations comprising:

using a system description file of an engineered industrial automation and control system for detecting direct neighbours of the selected node and for determining the direct neighbour nodes which have configured the same logical network constraints as the selected node.

15. A non-transitory computer-readable recording medium having a computer program recorded thereon that, when executed, causes one or more processors of a computer processing device to execute operations for validating reachability of nodes of a communication network of an industrial automation and control system, the computer program causing the computer processing device to execute operations comprising:

using a selected node to update a data set including discovered dataflow information by: (i) detecting direct neighbour nodes having a physical connection to the selected node, and (ii) updating the data set including discovered dataflow information by adding the selected node and those direct neighbour nodes which have configured logical network constraints matching logical network constraints of the selected node;

repeating the operations of: selecting a direct neighbour node in the data set including discovered dataflow information, and updating the data set including discovered dataflow information using the selected direct neighbour node; and comparing the data set including discovered dataflow information with a data set including designed dataflow information which defines reachability requirements for nodes of the communication network of the industrial automation and control system;

using a system description file of an engineered industrial automation and control system for detecting direct neighbours of the selected node and for determining the direct neighbour nodes which have configured the same logical network constraints as the selected node;

consolidating physical and logical information of a deployed substation automation and control system into consolidated system data; and using the consolidated system data for detecting direct neighbour nodes of the selected node and for determining the direct neighbour nodes which have configured the same logical network constraints as the selected node.

* * * * *